Figure 1:
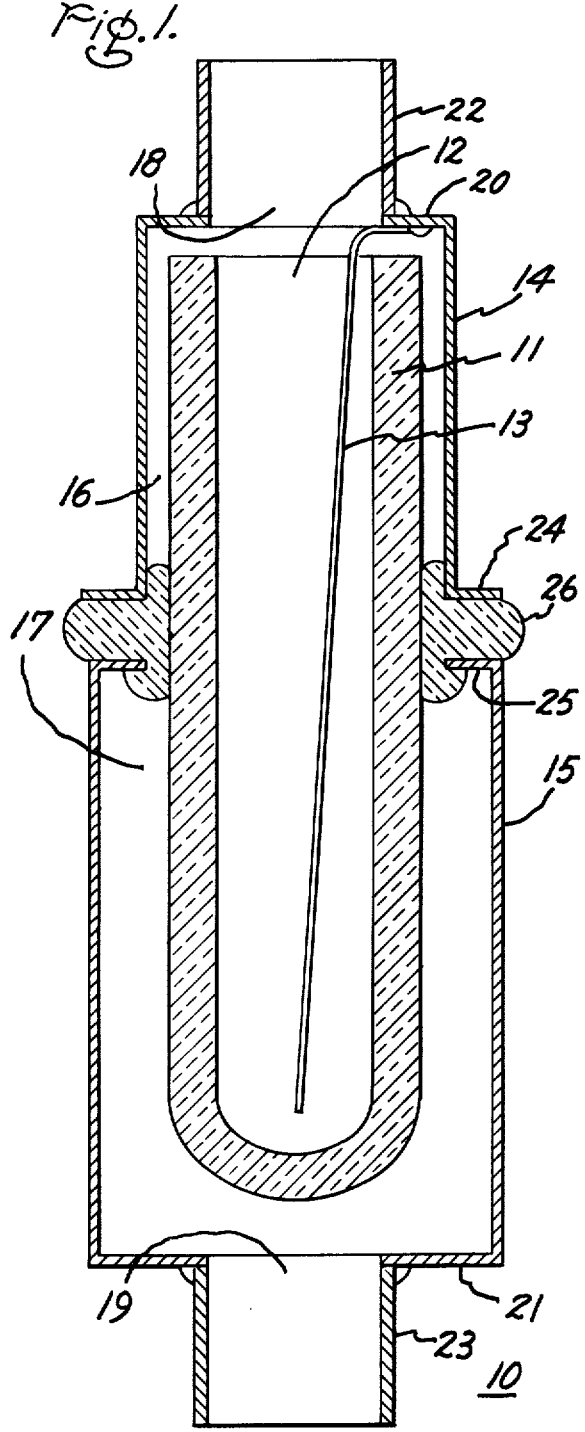

United States Patent [19]

Dubin et al.

[11] 3,881,955
[45] May 6, 1975

[54] WALL-SEALED BATTERY CASING AND SEALED PRIMARY SODIUM-HALOGEN BATTERY

[75] Inventors: Robert R. Dubin; William L. Mowrey; William A. Gilhooley, all of Schenectady, N.Y.

[73] Assignee: General Electric Company, Schenectady, N.Y.

[22] Filed: May 28, 1974

[21] Appl. No.: 474,036

Related U.S. Application Data

[62] Division of Ser. No. 239,890, March 31, 1972.

[52] U.S. Cl. ............................. 136/83 R; 136/86 A
[51] Int. Cl. ......................................... H01m 21/00
[58] Field of Search .......... 136/86, 83, 20, 6 R, 166

[56] References Cited
UNITED STATES PATENTS

| | | | |
|---|---|---|---|
| 3,404,036 | 10/1968 | Kermmel et al. | 136/83 R X |
| 3,607,417 | 9/1971 | McRae et al. | 136/86 A |
| 3,756,856 | 9/1973 | Pennenhouse | 136/83 R X |
| 3,762,955 | 10/1973 | Dubin | 136/83 R |
| 3,826,685 | 7/1974 | Dubin et al. | 136/83 R |
| 3,833,420 | 9/1974 | Will | 136/6 R |

*Primary Examiner*—John H. Mack
*Assistant Examiner*—C. F. Lefevour
*Attorney, Agent, or Firm*—Paul R. Webb, II; Joseph T. Cohen; Jerome C. Squillaro

[57] ABSTRACT

A wall-sealed battery casing and a sealed primary sodium-halogen battery are disclosed wherein the casing includes an open ended inner vessel of a solid crystalline ion-conductive material, an electronic conductor within the interior of the inner vessel, two outer opposed open ended metallic portions each with an additional opening surrounding the inner vessel, the two opposed vessel portions sealed together and to the outer wall of the inner vessel, and a fill tube associated with the respective additional opening in each outer vessel portion. A sealed primary sodiumhalogen battery has the above type of wall-sealed casing with a solid sodium containing ion-conductive inner vessel, a sodium anode and a cathode of a halogen in conductive material. The anode and cathode are positioned, respectively, in either the inner vessel or between the inner vessel and the outer vessel portion adjacent the closed end of the inner vessel.

1 Claim, 2 Drawing Figures

PATENTED MAY 6 1975  3,881,955

WALL-SEALED BATTERY CASING AND SEALED PRIMARY SODIUM-HALOGEN BATTERY

This is a division of application Ser. No. 239,890, filed Mar. 31, 1972.

This invention relates to a wall-sealed battery casing and to sealed primary batteries and, more particularly, to such wall-sealed battery casings and batteries employing an anode of sodium, sodium as an amalgam or sodium in a non-aqueous electrolyte and a cathode of a halogen in conductive material.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator." The solid crystalline ionconductive electrolyte in the above-mentioned sodium sulfur battery can be sodium beta-alumina.

Sodium amalgam-oxygen fuel cells are known in the prior art as, for example, described in Eidensohn U.S. Pat. No. 3,057,946 issued Oct. 9, 1962 under the title "Fuel Cell System." A sodium amalgam is flowed over the face of a metallic plate within an aqueous solution of sodium hydroxide to provide the anode.

In copending patent application Ser. No. 153,364, filed June 15, 1971, entitled "Sealed Primary Sodium-Bromine Battery" in the names of Stephan P. Mitoff and Fritz G. Will, there is described and claimed a sealed primary sodium-bromine battery employing a sodium type anode and a cathode of bromine in conductive material within a casing and separated by a solid sodium ion-conductive electrolyte.

In U.S. Pat. No. 3,793,080, in the name of Heinrich J. Hess and entitled "Sealed Primary Sodium-Halogen Battery with Bromine-Iodine Mixture," there is described and claimed a sealed primary sodium-halogen battery employing a sodium type anode and a cathode of a mixture of bromine and iodine in conductive material.

In copending patent application Ser. No. 230,864, filed Mar. 1, 1972, now abandoned, entitled "Battery Casing and Sealed Primary Sodium-Halogen Battery" in the names of Heinrich J. Hess and Fritz G. Will, there is described and claimed a battery casing and a sealed primary sodium-halogen battery wherein a cover with an opening is sealed to upper ends of an inner casing of a solid sodium ion-conductive material and an outer metallic casing. The above three copending patent applications are assigned to the same assignee as the present application.

Our present invention is directed to providing a wall-sealed battery casing and a sealed primary sodium-halogen battery operable at temperatures of −48° to 100° C in which the casing has a sealing surface area which is independent of the wall thickness of the inner vessel and in which the battery allows larger currents to be drawn than from a battery of equivalent size employing a solid electrolyte disk.

The primary objects of our invention are to provide an improved wall-sealed battery casing and a low temperature primary battery which has a zero self-discharge rate, high cell voltage and high energy density.

In accordance with one aspect of our invention, a wall-sealed battery casing includes an open ended inner vessel of a solid crystalline ion-conductive material, an electronic conductor within the interior of the inner vessel, two outer opposed open ended metallic vessel portions each with an additional opening surrounding the inner vessel, the two opposed vessel portions sealed together and to the outer wall of the inner vessel, and a fill tube associated with the respective additional opening in each outer vessel portion.

Figure 2:
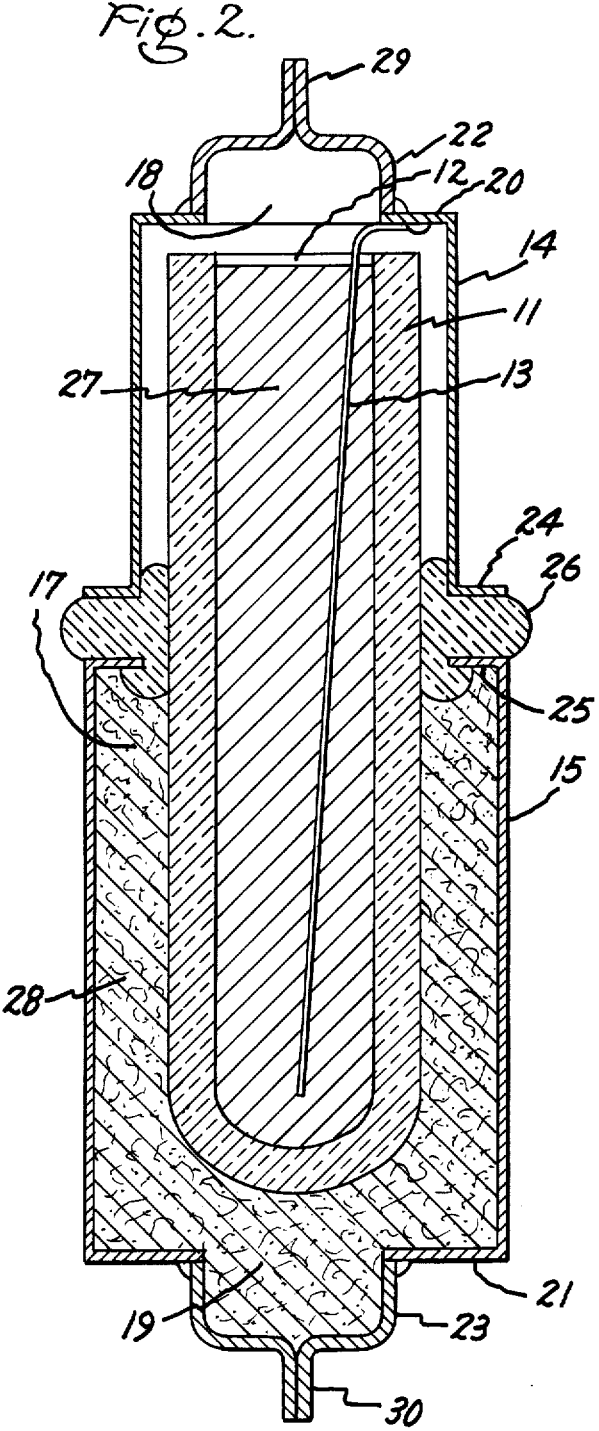

These and various other objects, features and advantages of the invention will be better understood from the following description taken in connection with the accompanying drawing in which:

FIG. 1 is a sectional view of a wall-sealed battery casing made in accordance with our invention; and FIG. 2 is a sectional view of a wall-sealed battery made in accordance with our invention.

In FIG. 1 of the drawing, there is shown generally at 10 a wall-sealed battery casing embodying our invention which has an inner casing 11 of a solid crystalline ionconductive material with one open end 12. An electronic conductor 13 is positioned within the interior of inner casing 11 and extending outwardly through open end 12 of casing 11. Two outer opposed metallic vessel portions 14 and 15 each have open end 16 and 17, respectively, and an additional opening 18 and 19, respectively, in each opposite closed end 20 and 21, respectively. While each opening 18 and 19 is shown in the opposite closed end 20 and 21, such opening can be located at other points in vessel portions 14 and 15. Metallic fill tubes 22 and 23 are affixed to each closed end 20 and 21 and in communication with openings 18 and 19, respectively, and an outwardly extending flange 24 and an inwardly extending flange 25 are affixed to the respective vessel portions 14 and 15 at their open ends 16 and 17. Metallic vessel portions 14 and 15 surround inner casing 11. A sodium and halogen resistant glass 26 seals flanges 24 and 25 together and seals the vessel portions 14 and 15 to the outer wall of inner vessel 11. Electronic conductor 13 is shown as affixed to the inner surface of closed end 20 of vessel portion 14.

In FIG. 2 of the drawing, there is shown a sealed primary sodium-halogen battery embodying our invention which battery includes the above-described wall-sealed battery casing shown in FIG. 1. An anode 27 is positioned preferably in inner vessel 11. Anode 27 which is shown as sodium metal, is selected from the class consisting of sodium, sodium as an amalgam, or sodium in a non-aqueous electrolyte. A cathode 28 of a halogen in conductive material is positioned preferably within outer vessel portion 15 adjacent the closed end of inner vessel 11. After the battery is filled, the associated fill tubes 22 and 23 are closed, for example, by welding at 29 and 30, respectively. It will be appreciated that the locations of the anode and cathode can be reversed. The resulting structure is a sealed sodium-halogen battery.

We found that a wall-sealed battery casing could be formed by positioning an inner vessel of a crystalline ionconductive material having an open end within two outer opposed open ended metallic vessel portions of a suitable, chemically stable metal such as niobium or tantalum. Each metallic vessel portion has an additional opening which is preferably in each opposite closed end.

The solid crystalline ion-conductive materials include various ion-conductive materials with oxides of sodium, lithium, potassium having ion conductivity or mixtures of these oxides. Additionally, one vessel portion can be made of Kovar alloy for use adjacent the sodium anode in a battery. Each outer metallic vessel portion has an oppositely directed flange affixed to its open end. Prior to positioning the outer vessel portions, a washer of a suitable sodium resistant glass, such as Kimble Glass No. N-51A is placed around the outer surface of the inner vessel at the proposed sealing junction. Such glass is also resistant to halogens. Other suitable sodium and halogen resistant glasses include Corning Glass Nos. 7056 and 7052, General Electric Company Glass No. 1013 and Sovirel Glass No. 747. The fill tubes are shown as a unitary structure with each respective outer vessel portion. However, such fill tubes can also be separate parts and sealed to each outer vessel portion, for example, by welding. An electronic conductor in the form of a thin wire is welded to the inner surface of the closed end of the associated outer vessel portion. The wire is made of a chemically stable metal, such as nickel.

We found that a helium leak tight wall seal can be formed by placing the above-mentioned glass washer around the inner washer between the opposed flanges of the outer vessel portions. The components are then placed in a closely confining graphite crucible equipped with a weight to compress the sealing glass during heating. The crucible is then placed in a retort which is continuously purged with high purity argon gas. The retort, which contains a thermocouple to assure accurate temperature control, is heated to 1,050° C for 10 minutes in a hydrogen furnace. Such helium leak tight wall seals can also be made in inert atmospheres using heating techniques, such as radio frequency heating, resistance heating, and laser heating. The resulting structure is a wall-sealed battery casing.

We found that a sealed primary sodium-halogen battery could be formed by employing the above-described wall-sealed battery casing. Further, the two outer metallic vessel portions can also have opposite closed ends without openings and associated fill tubes. If this structure is employed, it will be appreciated that the respective inner vessel and outer metallic vessel portion adjacent the closed end of the inner vessel will have to be filled with anode and cathode materials prior to assembly. The solid crystalline ion-conductive materials for the inner vessel of the battery is solid sodium containing ion-conductive material. Sodium ion-conductivity is necessary in the operation of the battery. "Sodium containing" includes sodium oxide, and mixtures of sodium oxide with other metallic oxides where there is sodium ion conductivity. The anode may consist of sodium, a sodium amalgam or sodium in a non-aqueous organic electrolyte. The anode is positioned preferably within the inner vessel by filling the inner vessel through its associated fill tube. Additionally, the portion of the inner vessel with the open end can be shortened to provide a larger volume reservoir for the electrode material. Such structure can also be employed in the battery casing shown in FIG. 1. When the sodium is in the form of a sodium amalgam its range of compositions is from about 95% sodium and 5% mercury by weight to about 35% sodium and 65% mercury. For the fully charged state of the cell, the amalgam composition is preferably high in sodium. Cells using sodium amalgam cannot be used efficiently at temperatures below 21.5° C due to complete freezing of the amalgam.

The use of non-aqueous electrolytes permits battery operation to much lower temperatures as determined by the freezing point of the non-aqueous electrolyte. The preferred electrolyte is propylene carbonate in which a sodium halide salt is dissolved. This electrolyte permits battery operation down to −48° C. After the inner casing has been filled with the anode material the fill tube is closed and sealed, for example, by welding.

The cathode is positioned preferably within the outer metallic vessel portion adjacent the closed end of the inner vessel through the associated fill tube and is in contact with both inner and outer vessels. The cathode comprises a halogen in conductive material. The halogen is selected from the class consisting of bromine, and a mixture of bromine and iodine with from 5 to 60 weight percent iodine.

The electrically conductive materials for the bromine include a porous matrix of carbon felt, a porous matrix of foam metal, an aqueous electrolyte, or a nonaqueous electrolyte. Preferred aqueous electrolytes are solutions of sodium halide salts. Preferred non-aqueous electrolytes are solutions of sodium halide salts in propylene carbonate.

The electrically conductive materials for the mixture of bromine and iodine include a porous matrix of carbon felt, a porous matrix of foam metal, dissolved small amounts of additives, such as NaCl, NaBr, KCl, $AlCl_3$, $AlBr_3$, $POCl_3$, etc., or a combination of both matrix and additive.

After the halogen in conductive material cathode has been positioned within the outer metallic vessel portion, the associated fill tube is closed, for example, by welding. This results in a sealed primary sodium-halogen battery.

Examples of wall-sealed battery casings and sealed primary sodium-halogen batteries made in accordance with our invention are set forth below:

EXAMPLE 1

A wall-sealed battery casing was assembled as above described and as shown in FIG. 1. The inner vessel was made of sodium beta-alumina having an open end. The vessel had a length of 720 mils, an outer diameter of 200 mils, an inner diameter of 160 mils, and a wall thickness of 20 mils. The two opposed open ended metallic vessel portions were spun from tantalum sheet to a final wall thickness of 0.01 inch. The first vessel portion had a length of 460 mils, an outer diameter of 320 mils, and a 0.045 inch inwardly extending flange. The second vessel portion had a length of 300 mils, an outer diameter of 250 mils, and a 0.045 inch outwardly extending flange. The additional opening in each outer vessel was 125 mils. A 0.005 inch nickel wire was spot welded to the interior surface of the second vessel portion to provide the electronic conductor for the inner vessel. A 15 mil thick tantalum fill tube was electron beam welded to the closed end of each outer vessel to communicate with the additional opening in each outer vessel. A 0.06 inch glass washer of Kimble glass N-51A with a 0.32 inch outer diameter was positioned around the outer wall of the inner vessel at a distance from both ends of the inner vessel. The two outer vessel portions were positioned around the inner vessel with the flanges at the respective open ends in contact with the opposite surfaces of the glass washer. The first vessel portion with the smaller outer diameter is positioned around the portion of the inner vessel with the open end, while the second vessel portion with the larger outer diameter is positioned around the portion of the inner vessel with the closed end. The nickel wire is inserted in the chamber defined by the inner vessel.

The above components were placed in a closely confining graphite crucible equipped with a weight to compress the sealing glass during heating. The crucible was then placed into a retort which was continuously purged with high purity argon gas. The retort, which contained a thermocouple to assure accurate temperature control, was heated to 1,050° C for 10 minutes in a hydrogen furnace. After the battery casing was removed, the wall seal was 0.040 inch thickness. The structure was tested and found to be helium leak tight. The resulting device was a wall-sealed battery casing.

EXAMPLE 2

A partially sealed primary sodium-bromine battery was assembled by employing the wall-sealed battery casing described above in Example 1. The inner vessel was filled with sodium amalgam of 90 weight percent sodium and 10 weight percent mercury through the associated fill tube after which the fill tube was sealed by welding. The outer vessel portion adjacent the closed end of the inner vessel was filled through the associated fill tube with 75 weight percent bromine in 25 weight percent propylene carbonate after which the fill tube was pinched closed. The resulting structure was a primary sodium-halogen battery.

EXAMPLE 3

The battery of Example 2 showed an open circuit voltage of 3.70 volts. The short circuit current was 30 milliamperes. At room temperature, this battery exhibited the following polarization behavior which is shown below in Table I.

TABLE I

| Volts | Current-Milliamperes | Current Density ma/cm$^2$ |
|---|---|---|
| 3.71 | 0 | 0 |
| 3.0 | 1.0 | 1.5 |
| 2.7 | 5.0 | 3.8 |
| 2.6 | 6.0 | 4.5 |
| 2.4 | 7.5 | 5.7 |
| 2.1 | 11.0 | 8.3 |
| 1.7 | 16.0 | 12.1 |

EXAMPLE 4

A sealed primary sodium-bromine battery is assembled by employing the wall-sealed battery casing described above in Example 1. The inner vessel is filled with sodium amalgam of 90 weight percent sodium and 10 weight percent mercury through the associated fill tube after which the fill tube is sealed by welding. The outer vessel portion adjacent the closed end of the inner vessel is filled through the associated fill tube with 75 weight percent bromine in 25 weight percent propylene carbonate after which the fill tube is sealed by welding. The resulting structure is a sealed primary sodium-halogen battery. At room temperature this battery has an open circuit voltage of 3.70 volts. The short circuit current is 30 milliamperes.

While other modifications of the invention and variations thereof which may be employed within the scope of the invention have not been described, the invention is intended to include such as may be embraced within the following claims.

What we claim as new and desire to secure by Letters Patent of the United States is:

1. A wall-sealed battery casing comprises an open ended inner vessel of a solid crystalline ionconductive material, an electronic conductor within the interior of the inner vessel and extending outwardly through the open end of the vessel, two outer opposed open ended metallic vessel portions each with an additional opening surrounding the inner vessel, each outer vessel portion has an oppositely extending flange at its open end, and a sodium and halogen resistant glass seals the adjacent flanges together and seals the outer vessel portions to the outer vessel portions to the outer wall of the inner vessel, a fill tube affixed to each additional opening, the electronic conductor affixed to the associated outer metallic vessel portion, and the two outer metallic vessel portions sealed together and to the outer wall of the inner vessel.

* * * * *